United States Patent Office 3,723,373
Patented Mar. 27, 1973

3,723,373
0.1% TO ABOUT 2.0% BY WEIGHT POLYTETRA-FLUOROETHYLENE EMULSION MODIFIED POLYETHYLENE TEREPHTHALATE WITH IMPROVED PROCESSING CHARACTERISTICS
Howard Robert Lucas, Danbury, Conn., assignor to American Cyanamid Company, Stamford, Conn.
No Drawing. Filed Oct. 4, 1971, Ser. No. 186,495
Int. Cl. C08f 45/24; C08g 39/10
U.S. Cl. 260—29.6 F               1 Claim

ABSTRACT OF THE DISCLOSURE

Compositions of matter comprising polyethylene terephthalate having incorporated therein small amounts of polytetrafluoroethylene wherein the resultant composition may be extruded, blow molded, film blown etc., are disclosed.

BACKGROUND OF THE INVENTION

This invention pertains to the field of molding compositions and more particularly to the field of polyethylene terephthalate, herein after sometimes called PET, wherein the PET is rendered processable under standard thermoplastic processing conditions, procedures and equipment.

The blending of various resin compositions with one another so as to impart to the final composition the attractive properties of both resins has been practiced for many years in the resin formulation industry. The blending of poly(tetrafluoroethylene) with various thermoplastic resins has also been widely practiced. For example U.S. Pat. No. 3,005,795 teaches the blending of polytetrafluorethylene, herein after sometimes called PTFE, in powder form with such thermoplastic polymers as poly (methyl methacrylate) polycarbonates polystyrene etc. Additionally, U.S. Pat. No. 3,294,871 discloses various compositions and a method for their production wherein PTFE is blended in latex form with various thermoplastic polymers including those mentioned above.

The amount of PTFE blended with the thermoplastic polymers in the above cited patents generally must range between about 10% to about 20% by weight before any substantial benefit can be achieved in the property of the ultimate composition. That is to say, the impact strength and melt index advantages imparted by the incorporation of the PTFE are not optimizing until from about 10% to about 20% of the PTFE is added.

SUMMARY

I have now discovered that the processability of PET can be materially enhanced by the blending therewith or incorporation therein of very small amounts of a PTFE emulsion; these trace amounts of a PTFE materially increase the melt viscosity and integrity of the PET. The small amount of PTFE employed requires only a short working time and minimum shear to produce the ultimate increase in viscosity of the resultant compositions.

Since PET is a very highly crystalline polymer, it is very fluid in the molten state. Its low-melt viscosity therefore does not permit one to extrude sheet or stock shapes and blow films therefrom. The incorporation of the small amount of PTFE emulsion produces an unexpectedly high increase in the melt viscosity of the resultant composition. As a result, the fabrication can extrude sheet or stock shapes therefrom, blow film, bottles or other articles etc. utilizing standard processing procedures and equipment generally employed for other thermoplastic materials. The incorporation of the PTFE also unexpectedly increases the ultimate elongation of the final compositions.

DESCRIPTION OF THE INVENTION INCLUDING PREFERRED EMBODIMENTS

As mentioned above, I have now discovered that the incorporation of small amounts of polytetrafluorethylene emulsion into polyethylene terephthalate materially increases the melt index, elongation and impact strength of the PET so as to render the ultimate composition processable according to standard thermoplastic processing procedures.

Polyethylene terephthalate, sometimes referred to as polyethylene glycol terephthalate, is a well known thermoplastic material which is produced by reacting an ethylene glycol with terephthalic acid in a manner such as disclosed in U.S. Pat. No. 2,255,313, hereby incorporated herein by reference.

Polytetrafluorethylene is likewise a well known material as evidenced from a brief perusal of the above cited U.S. patents, also hereby incorporated herein by reference. PTFE emulsion is merely PTFE which is in the form of a latex dispersion or emulsion in such materials as water, mineral oil, benzene and the like. The PTFE is present in the emulsion in the form of particles and when the PTFE and the PET are subjected to the shearing action of the mixing apparatus, the PTFE particles tend to become fibrous in consistency. Further description of the effect of shearing the PTFE particles can be obtained from the above cited U.S. patent. The particle size of the PTFE in the emulsion is not critical however it is preferred that the particle size range from about .1 micron to about .5 micron in order to obtain the optimum property in the resultant compositions. The solids content of the PTFE emulsion should generally range from about 30% to about 80%, preferably 50% to about 70%. The PTFE emulsion is blended with the PET resin to form a homogeneous mixture thereof, according to the instant invention, in amounts ranging from about 0.1% to about 2.0% by weight, based on the weight of the PET.

The PTFE emulsion and the PET resin, which may be utilized in solution or in a molten condition, may be blended homogeneously utilizing any known mixing device or technique such as a ball mill, a rubber mill, an extruder, a Banbury mixer and the like. The use of an aqueous latex of a PTFE is preferred since the water can be removed from the resultant composition simultaneously with or subsequent to the blending of the components by heating to a temperature above 100° C. When other liquid phase materials are used in the emulsion, they may be removed from the ultimate compositions by evaporation, devolatilization and the like.

The composition of the instant invention may be compounded with various other materials such as pigments, dyes, binders such as glass, fillers, ultraviolet obsorbers, inhibitors, stabilizers, lubricants and the like without detracting from the novel properties listed herein above. They may be molded, extruded and the like into any desired shape or article and are generally applicable in any known thermoforming process.

The following examples are set forth for purposes of illustration only and are not to be construed as limitations on instant invention except as set forth in the appended claims. All parts and percentages are by weight unless otherwise specified.

Example 1

To a suitable mixing vessel are added 500 parts of polyethylene terephthalate pellets having an inherent viscosity of 0.92 in. To the vessel are then added 8.3 parts of a polytetrafluorethylene emulsion, 60% solids. The ingredients of the vessel are tumble blended for about 10 minutes and the resultant mix is then dried for about 3 hours at 125° C. The blend is then extruded through a single screw extruder at 500° F. and a test sample is molded from the extrudate. The properties of the test sample produced according to this example as compared with the polyethylene terephthalate without any added PTFE are set forth in Table I below.

TABLE I

| Properties | PET-PTFE blend | PET alone |
|---|---|---|
| Flexural strength | 15,700 | 14,300 |
| Flexural modulus (×10⁶) | .416 | .410 |
| Tensil strength | 8,600 | 9,000 |
| Percent elongation at break | >100 | 3.4 |
| Izod impact strength notched (f.p.p.i.) | .5 | .5 |
| Izod impact strength unnotched (f.p.p.i.) | 11.0 | 10.0 |
| Heating distortion temp. (° C.) at 264 p.s.i. | 84 | 81 |

Example 2

The procedure of Example 1 was again followed except that 3 different blends were prepared, the first containing .5% of PTFE powder the second containing 1.0% PTFE powder and the third containing .6% PTFE emulsion. The results of these runs compared to a system containing no PTFE as to the effect of the PTFE on the melt viscosity of the PET are set forth in Table 2 below.

TABLE II

| Melt viscosity conditions | A | B | C | D |
|---|---|---|---|---|
| Percent PTFE | 0 | 0.5 | 1.0 | 0.6 |
| PTFE type | | (¹) | (¹) | (²) |
| Temperature (° C.) | 260 | 260 | 260 | 260 |
| Capillary diameter, mils | 15 | 15 | 15 | 15 |
| Load (grams) | 3,800 | 3,800 | 3,800 | 3,800 |
| Melt index | 8.73 | 6.00 | 6.26 | 3.88 |

¹ Powder.
² Emulsion.

The melt index test values are determined as the number of grams of compositions which, in 10 minutes at 260° C. and 3800 p.s.i., will pass through an orifice of 15 mils diameter.

Example 3

The procedure of Example 1 is again followed except that the dried water free composition is extruded into a clear sheet under the following conditions.

Column 1:                                   Column 2
   Rear zone _____° F__ 510
   Zone 2 _____° F__ 520
   Zone 3 _____° F__ 520
   Die temperature _____° F__ 530
   Melt temperature _____° F__ 545
   Take off rolls _____° F__ 60
   Film thickness _____mils__ 48

The Gardner impact of the sheet is 3.2 inch lbs./mil. The melt viscosity of the PET with no PTFE emulsion added is too low to process into a sheet under the specified extrusion conditions.

Example 4

The sheet produced according to the instant invention in Example 3 is cold drawn from 48 mils to 15 mils by passing through nip rolls at room temperature. The Gardner impact strength of the resultant sheet is greater than 10.0 inch lbs./mil.

Example 5

The procedure of Example 1 is again followed except that only .1% of PTFE emulsion (60% solids) is employed. The percent elongation at break is greater than 50.

Example 6

Again following the procedure of Example 1, 2.0% of aqueous PTFE emulsion (50% solids) is blended with PET pellets and formed into a extrudate. The percent elongation at break of the resultant sheet is greater than 120 and the melt index, determined as set forth in Example 2, is 3.25. The composition is blow molded into an attractive bottle having good impact strength, high surface gloss.

I claim:

1. A composition of matter comprising (1) polyethylene terephthalate having incorporated therein from about 0.1% to about 2.0%, by weight, based on the weight of said (1), of polytetrafluoroethylene emulsion, said emulsion having a solids content of from about 30% to about 80%.

References Cited

UNITED STATES PATENTS

| 3,148,234 | 9/1964 | Boyer | 260—29.6 F |
| 3,290,412 | 12/1966 | Goldblum | 260—873 |
| 3,294,871 | 12/1966 | Schmitt et al. | 260—900 |
| 3,334,157 | 8/1967 | Larsen | 260—29.6 F |
| 3,644,593 | 2/1972 | Nowak et al. | 260—873 |

WILLIAM H. SHORT, Primary Examiner

E. WOODBERRY, Assistant Examiner

U.S. Cl. X.R.

260—873